stop member 13, 14 is pushed upwards by the spring 15. The tape applied around the stack of objects 10 is then closed and a new tape consisting of the tapes emanating from the tape supply reels 6 and welded together is ready to receive the next object or stack of objects to be enlaced.

What I claim is:

1. A device for applying a thermoplastic tape around an object or a stack of objects, said device comprising at least one set of two tape supply reels arranged at a distance from each other, two tape strainers arranged on the same side of the supply reels and mounted for movement towards and from each other and serving to force towards each other the portions of a tape extending between an object or a stack of objects and the supply reels after said tape has been applied in the form of a substantially U-shaped loop around part of the circumference of the object or stack of objects, said tape consisting of two previously interconnected tape portions, each of which emanates from a respective one of said two supply reels, two clamping faces formed on each one of the tape strainers and facing the other tape strainer, the clamping faces of each tape strainer being spaced apart in a direction transverse to the direction of movement of the tape strainers, a movable stop member having two side plates which are adapted to be inserted between the two tape strainers and are each bounded by a clamping face co-operating with a clamping face of one tape strainer, a clamping face co-operating with a clamping face of the other tape strainer and a supporting face which extends between the clamping faces of the respective side plate in the direction of movement of the tape strainers and faces the other side plate, tape bending-over members, of which each one is attached movably to a respective tape strainer, the first one of said bending-over members being mounted on its tape strainer for reciprocation in the direction of movement of the tape strainers in the space confined between the two side plates of the stop member and for movement towards the other tape strainer during its forward stroke, said first bending-over member being provided with side faces adapted to be moved along and at a small distance from the supporting faces of the stop member, a front face extending between said side faces and facing the other tape strainer, a melting through member protruding from said front face towards the other tape strainer and being situated midway between said side faces and a heating element for heating said side faces, said front face and said melting through member, the second one of said bending-over members being movably mounted on the other tape strainer and consisting of two parts adapted to be forced towards the supporting faces of the stop member, said second bending-over member having faces movable with respect to its clamping faces, by means of which, during operation, tape portions first come into contact with the heated front face of the first bending-over member and thereafter are forced towards the supporting faces of the stop member, and means for moving the tape strainer, the stop member, the first bending-over member with the melting-through member and the second bending-over member in a given order of succession, wherein at least said side faces and said front face of the first tape bending-over member are formed by the outer surface of the heating element constituting a bent strip of electrical resistance material forming part of said bending-over member, said strip being electrically insulated from the rest of the device and adapted to be connected to an electric power source.

2. A device as claimed in claim 1 wherein the parts of the second tape bending-over member are each provided with a side face, which, during operation is moved along a supporting face of the stop member and have each a front face which is and remains parallel to the front face of the first tape bending-over member which is adapted to cooperate therewith, and the second tape bending-over member is also mounted on its tape strainer for reciprocation in the direction of movement of the tape strainers in the space confined between the two side plates of the stop member and during operation is so moved as to closely follow the first tape bending-over member during the latter's return stroke through said space.

3. A device as claimed in claim 1, wherein the strip of electrical resistance material has midway between the side faces of the first bending-over member a cross rib which protrudes from the front face of said member and forms the melting-through member.

4. A device as claimed in claim 3, wherein the cross rib forming the melting-through member is formed by a forward bend of the strip, said bend having a substantially V-shaped cross-sectional area.

5. A device for applying a thermoplastic tape around an object or a stack of objects, said device comprising at least one set of two tape supply reels arranged at a distance from each other, two tape strainers arranged on the same side of the supply reels and mounted for movement towards and from each other and serving to force towards each other the portions of a tape extending between an object or a stack of objects and the supply reels after said tape has been applied in the form of a substantially U-shaped loop around part of the circumference of the object or stack of objects, said tape consisting of two previously interconnected tape portions, each of which emanates from a respective one of said two supply reels, two clamping faces formed on each one of the tape strainers and facing the other tape strainer, the clamping faces of each tape strainer being spaced apart in a direction transverse to the direction of movement of the tape strainers, a movable stop member having two side plates which are adapted to be inserted between the two tape strainers and are each bounded by a clamping face co-operating with a clamping face of one tape strainer, a clamping face co-operating with a clamping face of the other tape strainer and a supporting face which extends between the clamping faces of the respective side plate in the direction of movement of the tape strainers and faces the other side plate, tape bending-over members, of which each one is attached movably to a respective tape strainer, the first one of said bending-over members being mounted on its tape strainer for reciprocation in the direction of movement of the tape strainers in the space confined between the two side plates of the stop member and for movement towards the other tape strainer during its forward stroke, said first bending-over member being provided with side faces adapted to be moved along and at a small distance from the supporting faces of the step member, a front face extending between said side faces and facing the other tape strainer, a melting through member protruding from said front face towards the other tape strainer and being situated midway between said side faces and a heating element for heating said side faces, said front face and said melting through member, the second one of said bending-over members being mov-

United States Patent [19]

Coffman

[11] 4,366,022
[45] Dec. 28, 1982

[54] ARROW FLETCHING APPARATUS

[76] Inventor: Thomas E. Coffman, 1357 Carlile La., Myrtle Point, Oreg. 97458

[21] Appl. No.: 182,978

[22] Filed: Sep. 2, 1980

[51] Int. Cl.³ .......................................... B32B 31/00
[52] U.S. Cl. .................................. 156/538; 156/357; 269/38
[58] Field of Search .................. 156/357, 538; 269/38

[56] References Cited

U.S. PATENT DOCUMENTS

| | | | |
|---|---|---|---|
| 2,742,064 | 4/1956 | Quist | 269/38 |
| 3,027,156 | 3/1962 | Schnoor | 269/38 |
| 4,259,128 | 3/1981 | Jaunich | 156/475 X |

FOREIGN PATENT DOCUMENTS 859879  1/1961  United Kingdom .................. 269/38

Primary Examiner—David A. Simmons
Attorney, Agent, or Firm—Kolisch, Hartwell & Dickinson

[57] ABSTRACT

Apparatus for securing plural vanes on an arrow shaft. Each of the vanes has an elongate fin and a flared base adapted to be glued to the shaft. The apparatus includes a support on which the arrow is mounted for axial travel along a path. Angularly spaced about the path are plural adhesive applicators and associated vane carriers. The applicators are actuatable to apply adhesive to axially extending angularly spaced regions on the shaft. Each carrier has a slot dimensioned to exclude and to receive releasably the base and fin of a vane, respectively. After application of adhesive to the shaft, the carriers and vanes mounted releasably thereon are shifted toward the shaft to place the bases of the vanes firmly against adhesive-coated regions on the shaft. After adhesive set-up, the carriers are moved away from the shaft to disengage the vanes.

8 Claims, 8 Drawing Figures

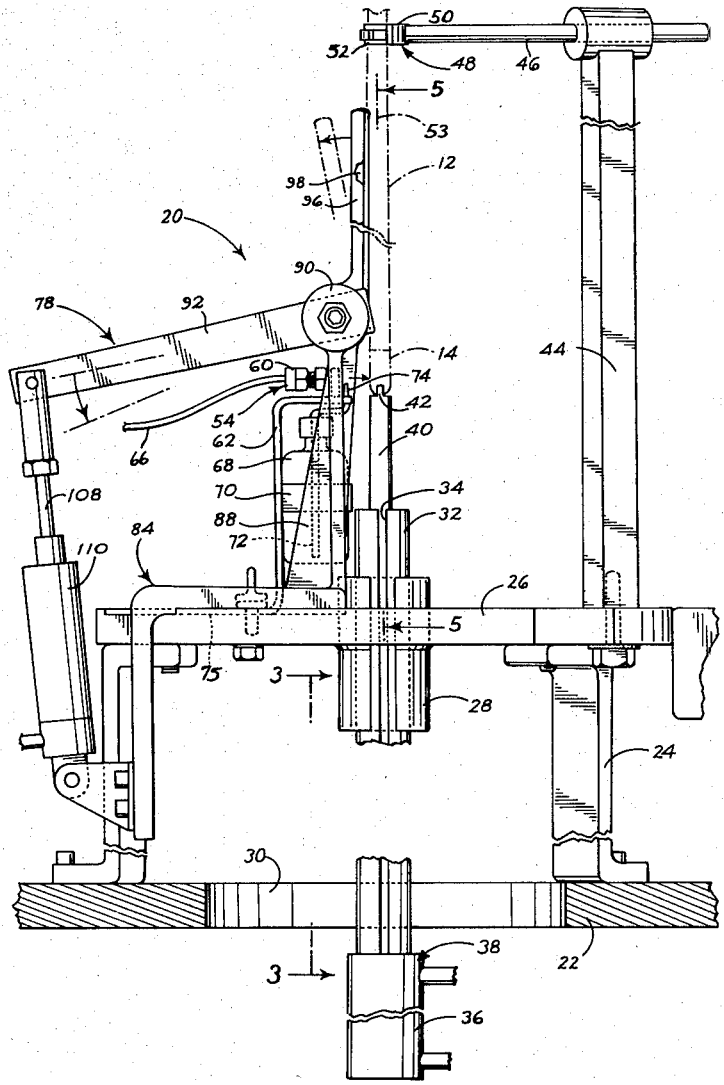

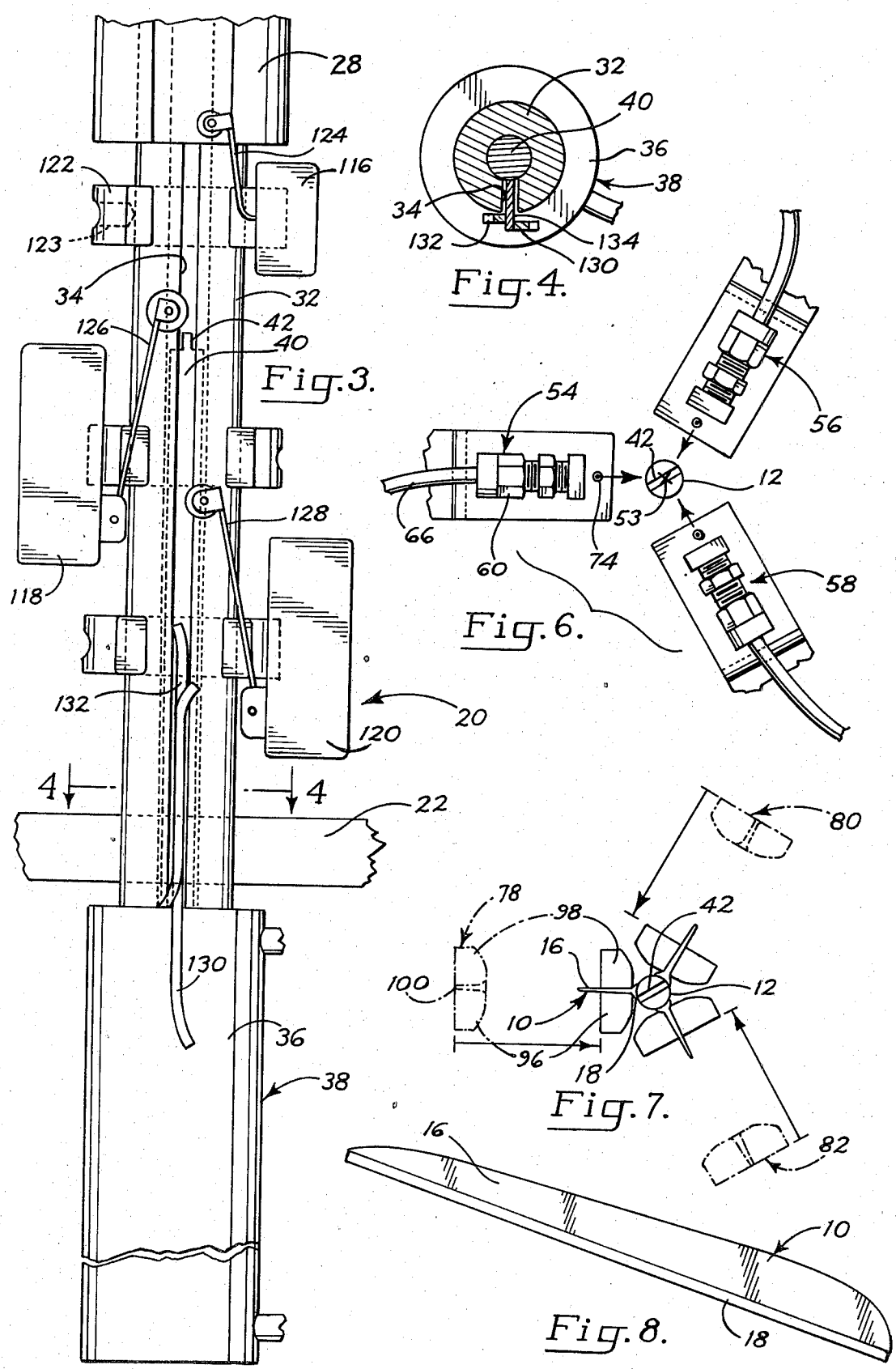

ARROW FLETCHING APPARATUS

BACKGROUND AND SUMMARY

The present invention relates to apparatus for placing vanes on an arrow shaft.

Problems inherent in making vaned arrows have held back automated manufacturing thereof. A chief problem is obtaining correct placement and orientation of the vanes on the arrow shaft. Commonly, this problem has been solved by the use of elaborate jigs which are not readily adaptable to automated operation.

One general object of the present invention is to provide an apparatus for securing vanes to an arrow shaft in an automated manner.

A more specific object of the invention is to provide in such apparatus means for applying adhesive to selected regions on an arrow shaft prior to the securing of vanes thereto.

Yet another object of the invention is to provide such apparatus which can accommodate vanes of different sizes.

The apparatus of the invention, according to a preferred embodiment, includes support means for releasably supporting an arrow shaft. With an arrow shaft placed in the support means, the support means is actuatable to move the shaft axially along a path finally to place the shaft in a vane-applying station where the shaft is properly positioned for the applying of vanes to its periphery. Disposed at angularly-spaced intervals about the path in which the shaft moves are plural adhesive applicators which are actuatable to apply adhesive to angularly-spaced regions on the shaft prior to the shaft reaching the vane-applying station. With the shaft in the vane-applying station, carriers which are distributed about the periphery of the shaft, and which are adapted to support vanes are shifted radially inwardly toward the shaft to press vanes against the adhesively coated shaft regions.

These and other objects and features of the present invention will become more fully apparent when the following detailed description of the invention is read in connection with the accompanying drawings, wherein:

FIG. 3 is an enlarged view of an arrow shaft support in the apparatus;

FIG. 4 is a sectional view taken generally along line 4—4 in FIG. 3;

FIG. 5 is a side view of parts of the apparatus, taken along line 5—5 in FIG. 2;

FIG. 6 is an enlarged plan view of adhesive applicators in the apparatus, seen from the same perspective as in FIG. 1;

FIG. 7 is an enlarged plan view of the tops of vane carriers in the apparatus, showing them in alternate positions; and FIG. 8 is an enlarged view of a vane usable in the apparatus.

DETAILED DESCRIPTION OF THE INVENTION

Figure 2:
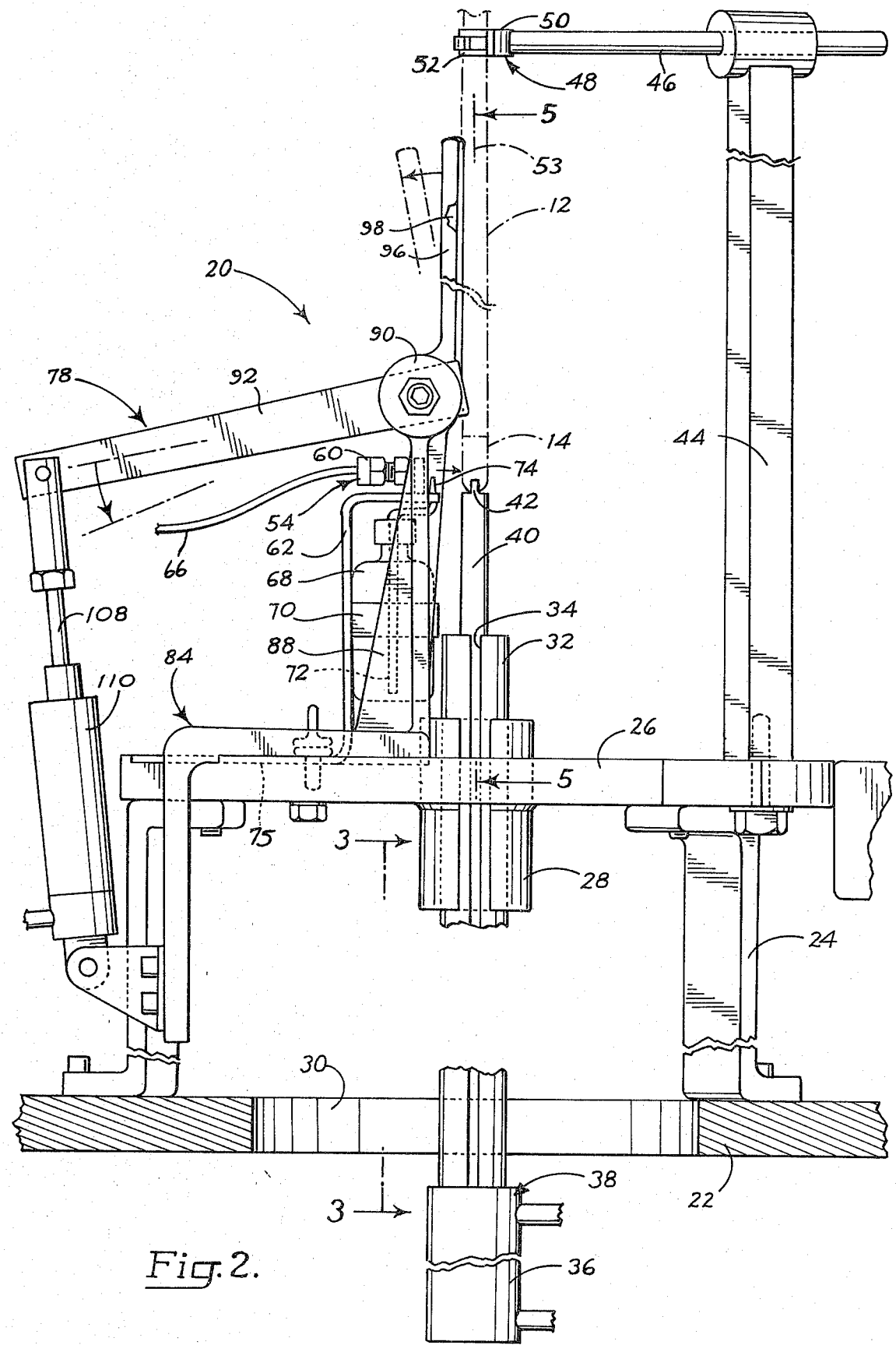
FIG. 2 is a fragmentary side view of the apparatus shown in FIG. 1, with parts removed for simplicity.

The apparatus of the present invention functions to secure plural vanes, such as a vane 10 seen in FIG. 8, to an arrow shaft, such as shaft 12 shown fragmentarily by dash-dot lines in FIG. 2. Shaft 12 is preferably cylindrical and formed of wood, aluminum tubing or the like. The shaft has at its lower end (opposite the tip end of the shaft) a nock 14 having formed therein a groove designed to receive a bow string.

Referring to FIG. 8, vane 10 is composed of an elongate fin 16, which is flared at its lower edge in FIG. 8 to form an elongate base 18. As seen best in FIG. 7, the base of such a vane has a shaft-confronting side which is concave to conform to an axially extending region on an arrow shaft. Vane 10 preferably is formed of a molded polymeric material, such as polyvinyl. The shaft-confronting side in the vane may be coated with a suitable sealant which is cobondable with both the polymeric material making up the vane and the adhesive used in attaching the vane to the shaft.

Figure 1:
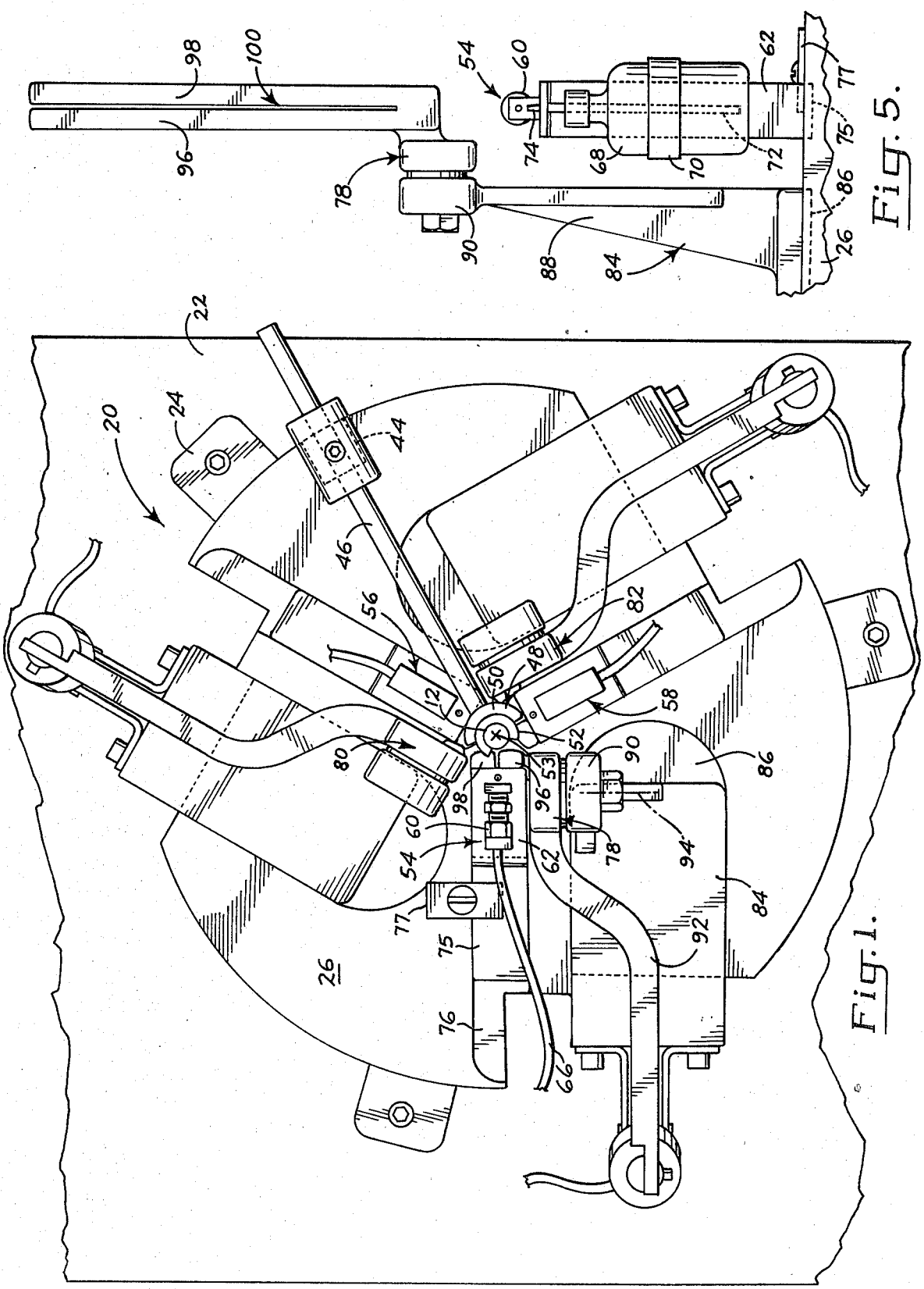
FIG. 1 is a plan view of apparatus constructed according to the present invention, with portions broken away and simplified.

Referring to FIGS. 1 and 2, apparatus constructed according to the present invention is indicated generally at 20. The apparatus includes a table 22 forming part of the frame of the apparatus which is normally suitably supported above the ground. Secured to the top of the table and projecting outwardly therefrom are legs, such as leg 24, and suitably fastened to the upper extremities of these legs is a platform 26. As viewed in FIG. 1, platform 26 has a substantially circular outline.

A metal pad structure 28 extends through a suitable hole made approximately centrally in platform 26 and is suitably joined to the platform. Supported by the pad structure and extending from an end located above the platform downwardly through a hole 30 provided in table 22 is an elongate pipe 32. Extending along a side of the pipe is an elongate slot 34.

Referring to FIGS. 2 and 3, in axial alignment with the pipe and secured to its bottom end is the cylinder 36 of a ram generally designated at 38. The ram has a rod 40 which extends into the interior of pipe 32. The upper end of the rod has formed thereon a projection 42 for securing the nock in an arrow shaft. Extension of the ram serves to shift the upper end of the rod upwardly from a retracted position shown in FIG. 3 to an extended position shown in FIG. 2.

Referring to FIGS. 1 and 2, secured to and projecting upwardly from platform 26 is a post 44. A rod 46 is mounted on the top of the post, and carried at an end of the rod is shaft guide 48. As probably best illustrated in FIG. 1, the shaft guide includes an outer semi-cylindrical member 50 which is suitably joined to the end of rod 46. Seated within this member is a horseshoe-shaped elastomer element 52. The ends of this element are deformable away from each other to accomodate the lateral insertion of an arrow shaft within the confines of the element. The guide is elevated above the upper end of pipe 32, with the interior of the guide axially aligned with the pipe.

What has just been described constitutes support means for an arrow shaft which is to be subjected to a vaning operation. A shaft, to prepare it for the applying of vanes thereto, and with the rod of ram 38 retracted, is placed with its nock end within the interior of pipe 32 and with the nock in the arrow fitting over projection 42. This serves to prevent the arrow shaft from rotating and also properly orients the shaft for the reception of vanes. An upper region of the shaft is fitted within guide 48. To place the shaft in the position it occupies when vanes are actually applied thereto, ram 38 is extended. This moves rod 40 upwardly, with the shaft supported on the end of the rod advancing axially upwardly along a path, indicated by a dash-dot line at 53 in FIG. 2. Shaft 12 is shown in approximately its vane-receiving position in FIG. 2. The shaft extends from the nock end upwardly through guide 48, upper portions of the shaft having been removed in the figure.

As shaft 12 travels upwardly, but before the shaft reaches its van-receiving position, a liquid adhesive is applied to axially extending regions on the shaft which are to receive the vanes. In the apparatus described herein, it is contemplated to secure vanes at three substantially equal angularly spaced, axially extending regions on the shaft, adjacent the shaft's nock. Adhesive is applied to the shaft, as it travels upwardly, by three applicators, indicated in FIGS. 1 and 6 at 54, 56, 58. For simplicity, applicators 56, 58 are illustrated somewhat schematically in FIG. 1, and not shown in FIG. 2. As can be appreciated in FIGS. 1 and 6, the three applicators are positioned adjacent shaft 12, when the latter is supported in the apparatus, at three substantially equal angularly spaced intervals thereabout.

The applicators will be described with reference to applicator 54, which is representative. As seen best in FIGS. 2 and 5, this applicator includes a nozzle 60 mounted on the upper end of a Z-shaped bracket 62, which is secured at its lower end in FIG. 2 to platform 26, in a manner to be described.

Compressed air is supplied to nozzle 60 through an air-supply tube 66 connected to the nozzle's left end in FIG. 2. Conventional valving (not shown) is used in controlling the supply of compressed air to nozzle 60 from a compressed air source (not shown). Compressed air supplied to the nozzle is directed through an aperture in the nozzle's right end in FIG. 2, radially toward path 53, as indicated in FIG. 6. Nozzle 60 is also referred to herebelow as means for directing a stream of air radially toward path 53.

With continued reference to FIGS. 2 and 5, a bottle 68 held on bracket 62 by a clamp 70 contains a liquid adhesive which is to be applied to a vane-receiving region on a shaft. A conduit 72 extending into the bottle 68 as shown is connected, at its upper end in this figure, to a needle 74 whose upper open end is disposed adjacent and immediately below the path of air discharged from nozzle 60. It can be appreciated that as air is discharged across the top of the needle, a vacuum is produced in conduit 72 which draws adhesive toward the upper end of the needle. Here the adhesive is mixed with the stream of air and sprayed against the shaft. Bottle 68 and the liquid adhesive contained therein is also referred to herebelow as a source of liquid adhesive. The just-mentioned source, nozzle 60, and conduit 72 interconnecting the two are also referred to herebelow, collectively, as applicator means.

As can be seen best in FIG. 1, a lower foot 75 of bracket 62 is carried in a radially extending groove 76 (FIG. 1) formed in platform 26. A clamp 77 which engages foot 75 is used in clamping applicator 54 at a desired radial position with respect to path 53.

When the shaft in the apparatus is moved fully upwardly to its vane-receiving position (the position shown in FIG. 2), vanes are applied to the axially extending regions on the shaft to which adhesive material has been applied by the applicators just described. Vanes, such as vane 10 described above with reference to FIG. 8, are carried by the apparatus to positions against the glued portions of the shaft by three carriers indicated at 78, 80, 82 in FIGS. 1 and 7. Carriers 78, 80, 82 which are arranged at substantially equal angularly spaced intervals about the shaft in the apparatus, are associated with applicators 54, 56, 58, respectively. For simplicity, carriers 80, 82 are shown somewhat schematically in FIG. 1, and not shown in FIG. 2.

Carrier 78 is mounted on a chair-like bracket 84 seen best in FIG. 2. A nut-and-bolt combination is used in securing the bracket at a desired position with respect to a groove 86 in which the bracket rides (FIG. 1). The bracket includes an upright post 88 which terminates at its upper end in FIGS. 2 and 5 in a socket 90.

Carrier 78, which is representative, is composed of an elongate arm 92 which is mounted, adjacent its right end in FIGS. 1 and 2, on socket 90 for pivoting with respect thereto about an axis indicated by dash-dot line 94 in FIG. 1. Axis 94 is perpendicular to the direction of adhesive spray from associated applicator 54. Integrally formed with arm 92, adjacent its right end in FIGS. 1 and 2, is a pair of substantially upright prongs 96, 98. As seen best in FIG. 5, these prongs extend side-by-side along their lengths, forming therebetween an elongate slot 100. As seen in FIG. 1, slot 100 is angularly aligned with the region on shaft 12 to which adhesive is applied by applicator 54. With reference particularly to FIG. 7, the slot is dimensioned to receive releasably therein the fin of a vane, such as fin 16 of vane 10, with the fin's base portion 18 abutting, but being excluded from, the right side of the slot in FIG. 7.

The left end region of arm 92 in FIG. 2 is pivotally connected to a rod 108 of a ram 110 whose lower end in FIG. 2 is pivotally mounted on a lower portion of bracket 84 shown. Ordinarily, ram 110 is spring biased toward a retracted position (not shown). At this position, prongs 96, 98 are angularly spaced from a shaft in the apparatus at positions indicated by dash-dot lines in FIGS. 2 and 7. Extension of ram 110, by supply of compressed air thereto, produces shifting of the carrier to place the prongs in an upright position against the shaft, as shown by solid lines in FIGS. 2 and 7. As seen in best FIG. 7, in the latter position, the base of a fin held in the carrier is pressed against an axially extending region on the shaft. Ram 110 is also referred to herebelow as shifting means.

Operation of apparatus 20 will now be described. Initially, rod 40 is placed in its lowered position, shown in FIG. 3. A shaft, such as shaft 12, is placed in the apparatus with its lower portion extending into the opening in pipe 32 and with the shaft nock being placed over projection 42. As noted above, the shaft is now angularly positioned in the apparatus for the reception of vanes at the shaft regions indicated in FIG. 7.

Vanes, such as vane 10 in FIG. 7, are releasably mounted on the three carriers by inserting the fins of the vanes releasably into the slots in associated carriers, and moving the vanes downwardly until the lower vane ends (corresponding to the right end of vane 10 in FIG. 7) abut the lower ends of the associated slots.

Ram 38 is actuated, by supplying compressed air thereto, to effect upward travel of rod 40 at a controlled rate. As the shaft travels upwardly the upper ends of the vane-receiving regions on the shaft pass applicators 54, 56 and 58. At this instant, the three applicators are actuated simultaneously, by supplying compressed air thereto. This produces, in the manner indicated above, streams of compressed air and liquid adhesive directed against the regions on the shaft to which the vanes are to be secured. Application of liquid adhesive to the vane to the shaft continues, as the shaft travels upwardly, until the lower ends of the vane-receiving regions on